Sept. 2, 1958   L. A. WARDELL ET AL   2,850,190
ASSEMBLING MACHINE
Filed May 28, 1956   6 Sheets-Sheet 2
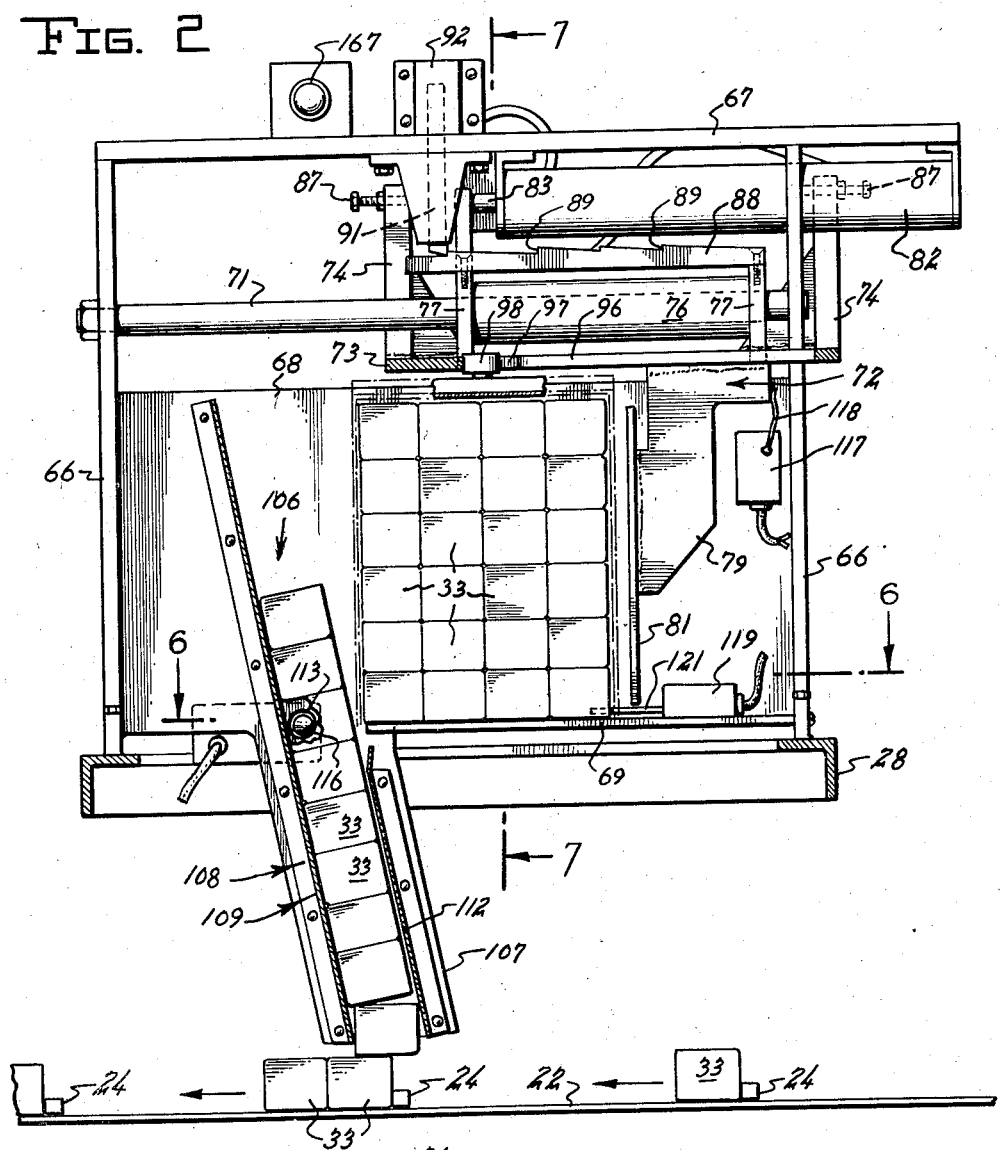
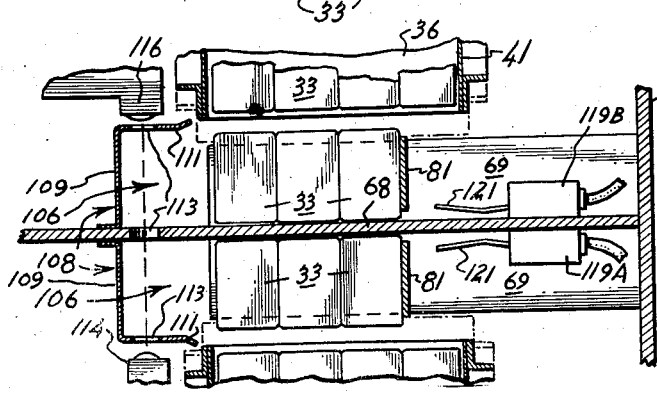
INVENTORS.
ROBERT F. KRUPP
BY LYNWOOD A. WARDELL
Townsend and Townsend
ATTORNEYS.

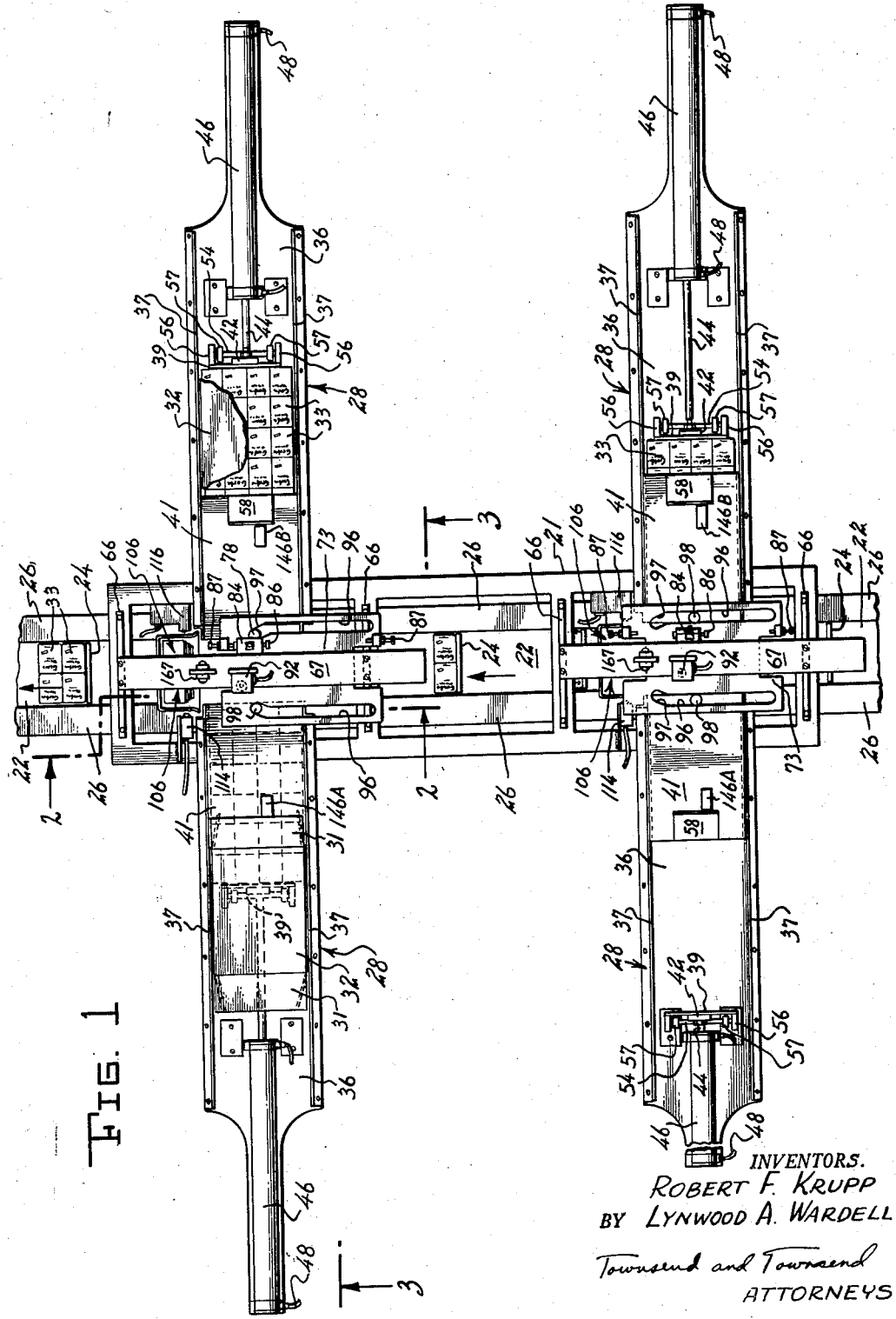

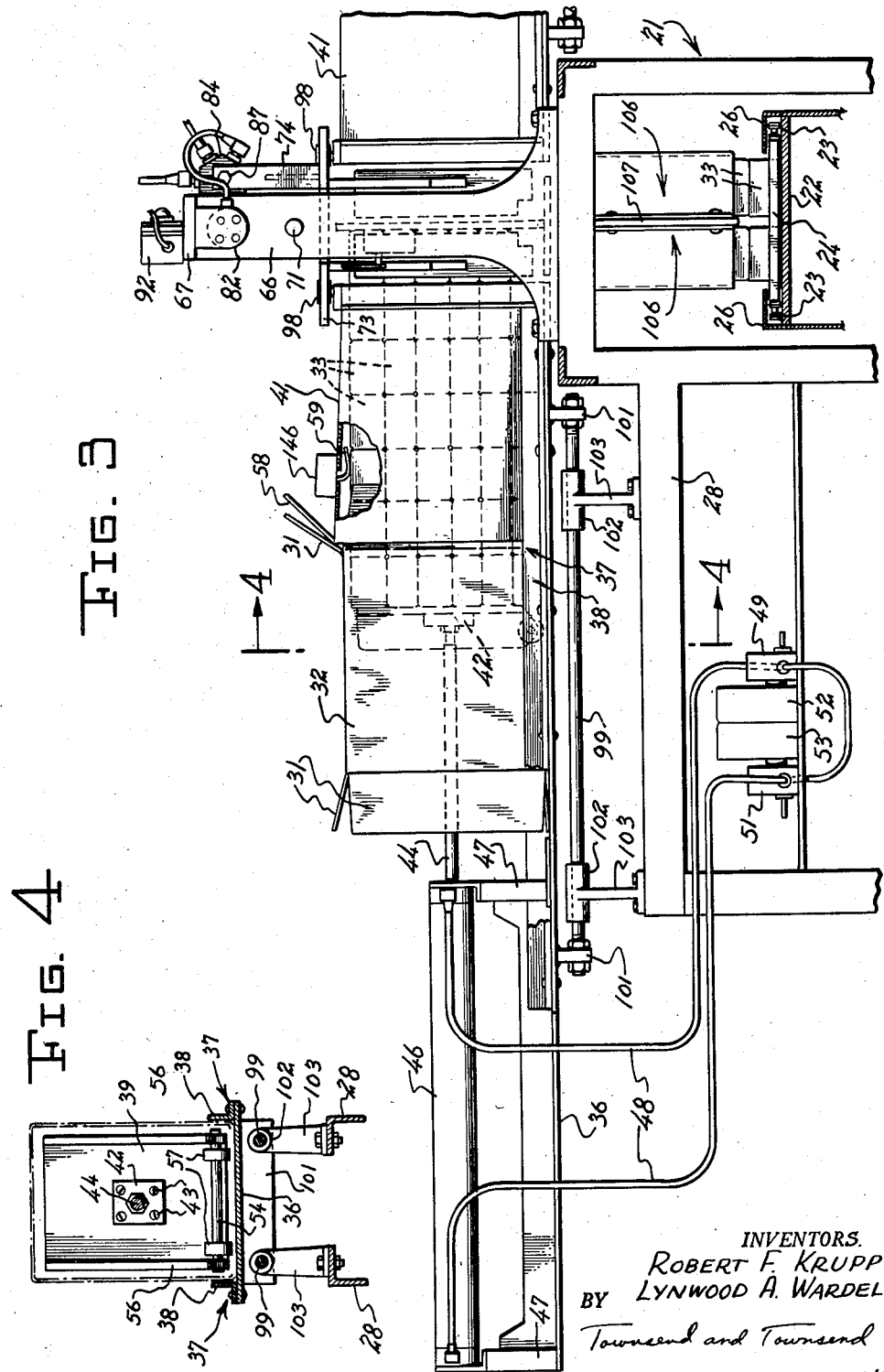

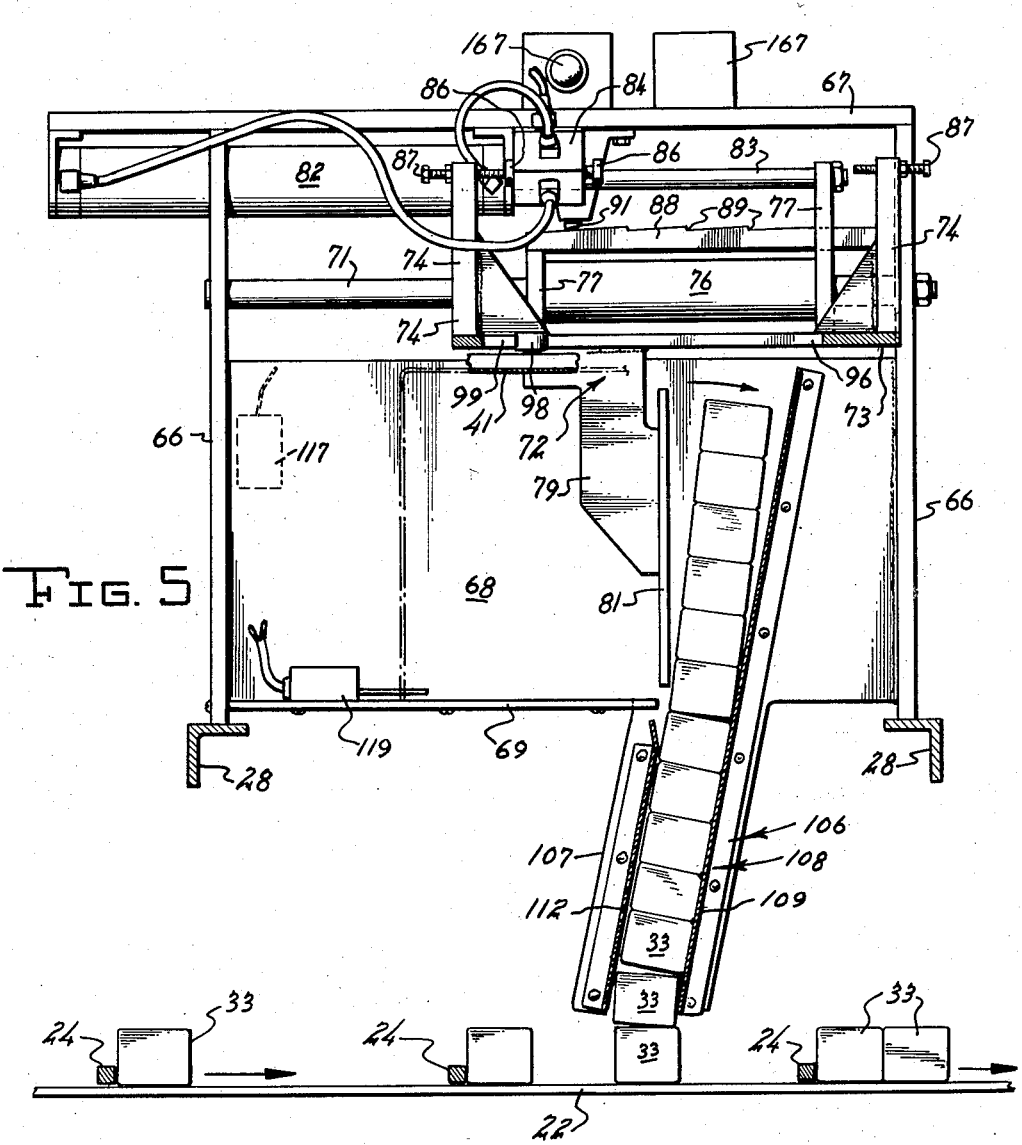

Sept. 2, 1958    L. A. WARDELL ET AL    2,850,190
ASSEMBLING MACHINE
Filed May 28, 1956    6 Sheets-Sheet 5

INVENTORS.
ROBERT F. KRUPP
BY LYNWOOD A. WARDELL
Townsend and Townsend
ATTORNEYS INVENTORS.
ROBERT F. KRUPP
BY LYNWOOD A. WARDELL
Townsend and Townsend
ATTORNEYS.

United States Patent Office 2,850,190
Patented Sept. 2, 1958

2,850,190
ASSEMBLING MACHINE

Lynwood A. Wardell, Hayward, and Robert F. Krupp, San Lorenzo, Calif., assignors to Gerber Products Company, Fremont, Mich., a corporation of Michigan Application May 28, 1956, Serial No. 587,559

4 Claims. (Cl. 214—310)

This invention relates to a new and improved machine for assembling articles in position for subsequent wrapping as a unit.

For clarity in understanding the inventive concept, a description of a specific problem to which the present invention furnishes a solution will be set forth, although it will be understood that the invention has application to various other uses. The specific use of the invention which will be hereinafter set forth is the mechanical and electronic assembly of small boxes or packages such as those containing infants' dry cereal. Small packages of different varieties of infants' cereal, each package containing a sufficient quantity for one or a few portions, are received at the assembling machine in separate shipping cartons. It is desired to assemble and subsequently wrap a unit consisting of packages of four different varieties. The present invention eliminates manual assembly of the units and thus reduces labor cost and speeds up production and synchronizes the assembly of the groups of individual cartons with the wrapping machine.

As hereinafter described in greater detail, the machine provides four receiving stations at which shipping cartons filled with individual packages of cereal or the like are deposited, it being understood that all of the packages at each station are identical, but that the varieties at each of the four stations are ordinarily different. At each station the cartons are fed in timed sequence into a hopper, the hoppers discharging onto a moving belt, the individual cartons being deposited on the belt in proper relationship for assembly of the desired group.

Accordingly another principal advantage of the invention is the versatility afforded in the assembly of the groups of cartons, depending upon the requirements of the user.

Still another object and advantage of the invention is the provision of means which insure proper feeding from the shipping cartons into the hoppers and discharge therefrom.

Another object of the invention is the provision of means to insure that each of the hoppers is maintained at a proper level.

Other objects of the present invention will become apparent upon reading the following specification and referring to the accompanying drawings in which similar characters of reference represent corresponding parts in each of the several views.

In the drawings:

Fig. 1 is a top plan view partly broken away in section to reveal interior construction;

Fig. 2 is a fragmentary transverse sectional view taken substantially along the line 3—3 of Fig. 1;

Fig. 3 is a longitudinal sectional view taken substantially along the line 3—3 of Fig. 1;

Fig. 4 is a fragmentary sectional view taken substantially along the line 4—4 of Fig. 3;

Fig. 5 is a fragmentary view of a portion of the apparatus partly broken away in section to reveal interior construction;

Fig. 6 is a fragmentary horizontal sectional view taken substantially along line 6—6 of Fig. 2;

Figure 7:
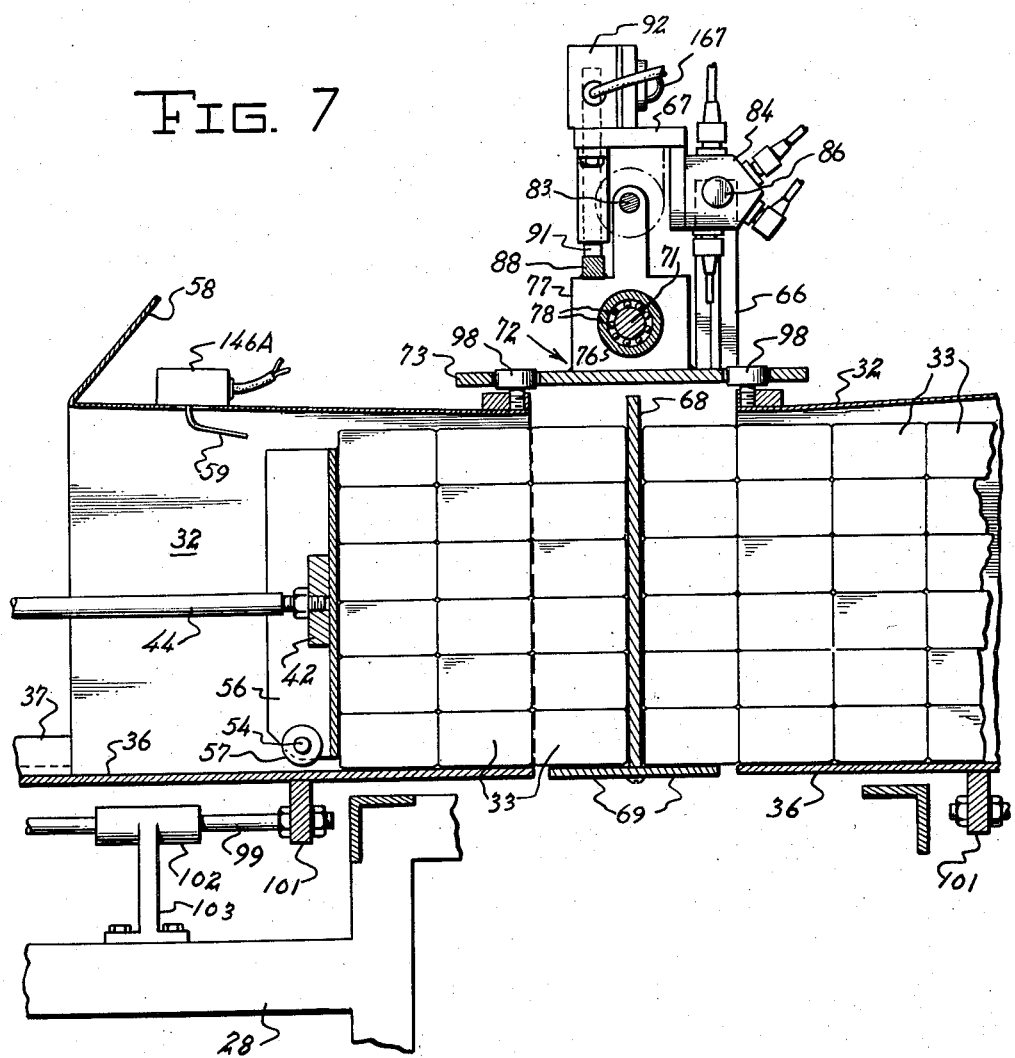
Fig. 7 is a vertical sectional view taken substantially along line 7—7 of Fig. 2.

The present invention comprises a conveyor frame 21 having a horizontally disposed bed 22 on either side of which is mounted for substantially horizontal movement a continuous chain 23. Transversely extending lugs 24 at regularly spaced intervals are connected at their opposite ends to chains 23. Chains 23 are driven by means not herein illustrated or described in the direction shown by the appropriate arrows in Fig. 1 and continue into a conventional wrapping machine (not shown), the details of which form no part of this invention. Bed 22 is provided with side guides 26 to maintain the packages on bed 22 and aligning means 28 to keep chains 23 in position. Grouped around conveyor frame 21 and extending transversely thereto are four receiving station frames 28 which are positioned in pairs, the stations of each pair being directly opposite each other and on opposite sides of bed 22. Inasmuch as each station is substantially identical, the description of the mechanical details of a single station will suffice for all four. Each pair of stations operates together and deposits a package from each station of the pair on bed 22. The packages from the most remote stations are picked up by a lug 24 and then pick up the next pair of packages at the nearest pair of stations.

The flaps 31 at each end of the shipping carton 32 are open before the same is deposited in the receiving station, each carton containing a plurality of small packages 33 of cereal or the like in regular arrangement. As herein shown, the arrangement comprises 96 packages per carton arranged in four layers. Each layer comprises four rows extending transversely across the receiving station, each row having a vertical stack of six cartons. It will be understood that the previously described arrangement of packages 33 in carton 32 is subject to wide modification.

The shipping cartons 32 are deposited on bed 36 which is provided with longitudinally extending angles 37, the inner vertical flanges 38 of which provide longitudinal guides for the cartons. A horizontally reciprocal plunger 39 enters each carton through the open rear flaps 31 thereof and pushes the packages out through the open front flaps thereof into a housing 41.

A fitting 42 is fastened by means of screws 43 to the center of the rear face of plunger 39 and receives the outer end of piston rod 44 which extends horizontally rearwardly into pneumatic plunger cylinder 46 disposed on brackets 47 attached to bed 36 at the rear of the station. A double-acting piston (not shown) located in cylinder 46 on rod 44 is moved in either direction by pneumatic pressure supplied by lines 48 at opposite ends of cylinder 46, which lines lead from valves 49, 51 acted upon by solenoid controls 52 and 53, respectively, as hereinafter set forth in a subsequent part of this specification. Plunger 39 is provided with a transversely extending shaft 54 journaled at the bottom of rearwardly extending reinforcing lugs 56 on opposite sides of the rear face thereof. Shaft 54 rotatively receives rollers 57 which run on bed 36 or the inside of shipping carton 32 and support plunger 39 in proper position.

Housing 41 is slightly larger in cross-sectional dimension than a layer of packages. Shipping carton 32 is located on the top of the inner end of bed 36 to receive the contents of each shipping carton. The top leading edge of housing 46 is provided with an angularly disposed guide 58 functioning to hold the topmost flap 31 open. Projecting through the top of housing 41 is a switch arm 59 attached to switch 146. When plunger 39 has pushed the contents of a shipping carton 32 past the locus of switch 146, the switch arm 59 is depressed, which illuminates a signal light 167 so that attendant may prepare and install another shipping carton to replace the empty one.

Located on conveyor frame 21 at each pair of receiving stations is a pair of vertically disposed ends 66 which are connected together by crossover 67. Vertical separating plate 68 between ends 66 maintains the packages at each station of the pair of stations separate. Horizontal supports 69 projecting from opposite faces of plate 68 receive packages 33 from housing 41. Extending between ends 66 is a horizontal transversely disposed, heavy, rigid support rod 71. Transversely slidable upon support rod 71 is carriage 72 which is provided with a horizontal carriage plate 73 and upwardly extending ends 74. Sleeve 76 fastened to carriage plate 73 by means of legs 77 and provided with a plurality of ball bearings 78 reciprocates on support rod 71. Depending from carriage plate 73 on opposite sides of separating plate 68 are irregularly shaped pusher arms 79 which extend downwardly and are fastened to pusher plates 81 on opposite sides of separating plate 68, each having a width equal to the width of a row of packages and a height equal to the height of a column of packages. Mounted on crossover 67 is a pneumatic carriage cylinder 82 having a piston (not shown) to which is attached piston rod 83 extending outwardly and fastened to one of legs 77. Thus as the piston is caused to reciprocate in cylinder 82, the carriage 72 is moved back and forth and on the feed stroke, pusher plate 81 pushes packages before it. Pneumatic valve 84 is fastened to crossover 67 and provided with a pair of valve actuating buttons 86 on opposite sides thereof. Adjustment screws 87 on ends 74 engage buttons 86 on the opposite ends of the travel of carriage 72 and reverse valve 84, causing pneumatic pressure to be applied alternately to opposite ends of cylinder 82. On the feed stroke of carriage 72 it is desirable that the carriage advance in increments equal to the width of one package 33. For such purpose ratchet 88 is fastened to carriage 72, notches 89 of ratchet 88 being engaged by vertical slidable pawl 91 which is retracted upon energization of solenoid 92. Hence feed movement of carriage 72 is intermittent when pawl 91 is retracted from the appropriate notch 89 in ratchet 88 and inasmuch as, as hereinafter explained in detail, the energization of solenoid 92 is of short duration, the travel of carriage 72 is limited to the distance between notches. On the retracting stroke of cylinder 82, ratchet 88 is inoperative.

Carriage plate 73 is formed with transversely extending slots 96 on opposite sides of separating plate 68, the forward ends of which are formed with inwardly diverging extensions 97. A roller 98 on the adjacent housing 41 is received in slot 96. Accordingly, when carriage 72 is fully retracted, housing 41 and bed 36 are moved inwardly. As soon as carriage 72 has advanced so that roller 98 is out of the diverging extension 97 and into straight portion 96, housing 41 and bed 36 are moved away from carriage 72. Hence packages in the next layer in housing 41 do not interfere with feeding of the layer already on supports 69. In order to permit outward movement of housing 41 and bed 36, bed 36 is supported by means of horizontally extending rods 99 attached to cross braces 101 depending from bed 36. Rods 99 are slidingly supported by sleeves 102 on feet 103 attached to frame 28.

A pair of hoppers 106 at the inner end of the travel of carriages 72 receive each column of packages 33 as it is discharged thereinto upon movement of carriage pusher 81. Hoppers 106 are separated from each other by a downward extension 107 of separating plate 68 which comprises one side of the hopper. Inclined angularly shaped members 108 fastened to plate 68 comprise the forward wall 109 and opposite sides 111 of hopper 106. Below the level of horizontal support 69 is an inclined rearward wall 112 parallel to forward wall 109. Hoppers 106 terminate at a level spaced above bed 22 a distance slightly greater than the thickness of one package 33. Hence as each package is moved away by lug 23, the next package drops onto the bed. Apertures 113 are formed in side walls 111 of hopper 106 and also in extension 107, the three apertures 113 being aligned. A light source 114 is installed on one side and a photoelectric cell 116 on the opposite. Hence when the number of packages 33 in the pair of hoppers 106 diminishes below the level of apertures 113, cell 116 is actuated by light from light source 114 to initiate a sequence of operations hereinafter described in detail.

Located on vertical separating plate 68 is a double-acting carriage switch 117 having a switch arm 118 which is contacted by one of pusher arms 79 when carriage 72 is in fully retracted position, as shown in Fig. 2. As soon as carriage 72 has advanced beyond first notch 89 of ratchet 88, switch 117 is thrown from one position to another, as hereinafter described. On either side of vertical separting plate 68 is a double-acting sequence switch 119A or 119B having an arm 121 extending into the path of the packages when they are initially moved onto horizontal supports 69.

Figure 8:
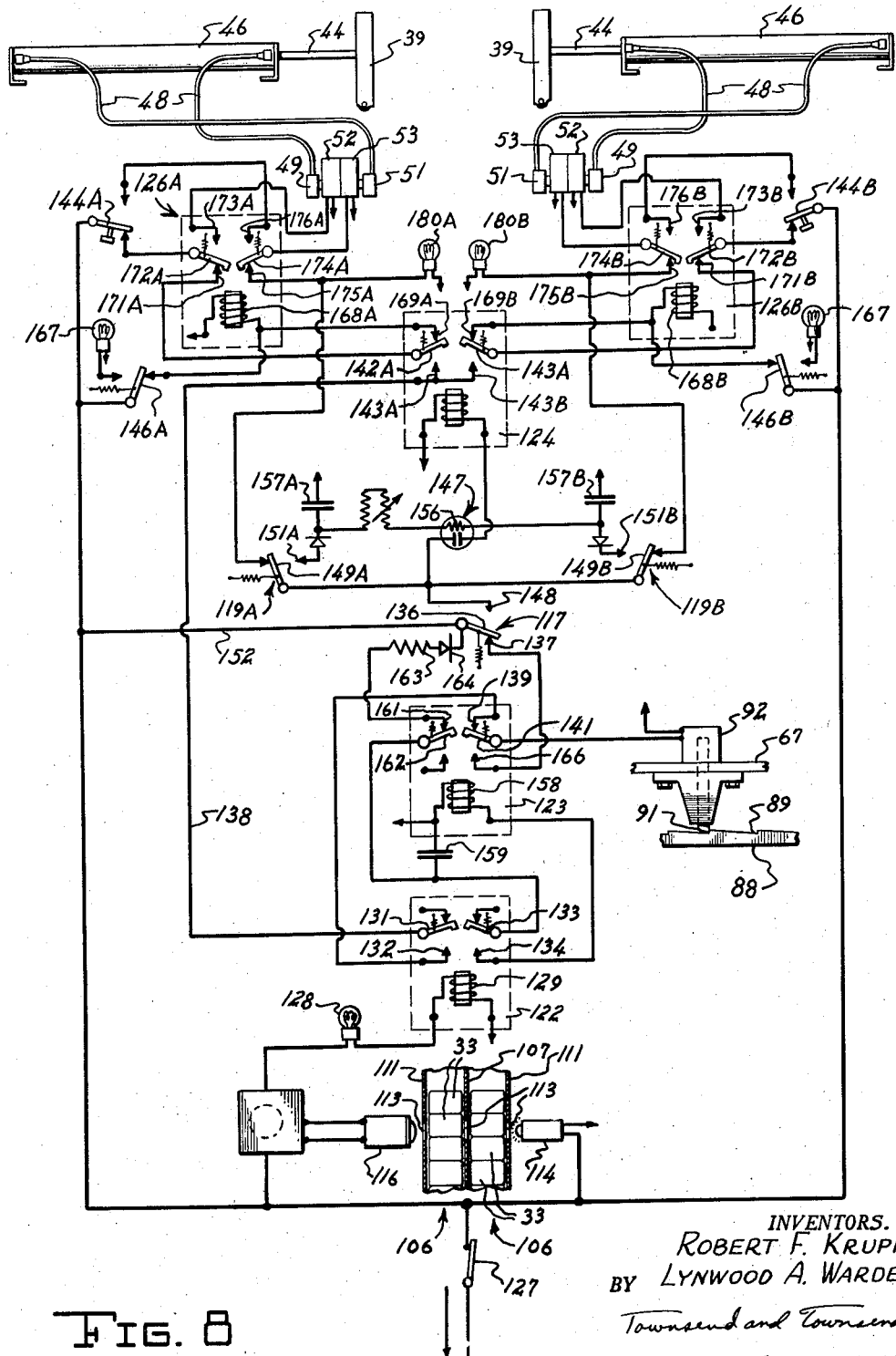
Fig. 8 is a schematic wiring diagram of the electrical portions of the invention.

Referring now to the wiring diagram for the machine, as shown in Fig. 8, there are employed five relays 122, 123, 124, 126A and 126B which control the operation of carriage 72 and plungers 39. Assuming main switch 127 is closed, when the quantity of packages 33 in hoppers 106 diminishes below the level of apertures 113, light from source 114 is received by photoelectric cell 116, thereby illuminating signal lamp 128 and energizing coil 129 of first relay 122, thereby engaging contacts 131 and 132 and 133 and 134. Assuming that carriage 72 is fully retracted, carriage switch 117 is in such position that contacts 136 and 137 engage. Assuming that relay 123 is in the position shown in Fig. 8, and that lead wire 138 is energized (as hereinafter appears), current flows through contacts 131 and 132 and also through contacts 139 and 141 of relay 123 and thus energizes solenoid 92 to retract pawl 91 and allow carriage 72 to advance until hoppers 106 are filled above the level of apertures 113. Lead wire 138 is energized when either of contacts 142A or 142B engage contacts 143A or 143B, respectively, which occurs when relay 124 is energized. Assuming relay 124 has been energized, as hereinafter explained, and that relays 126A and 126B are in the position shown in Fig. 8, and further that starter buttons 144A and 144B are in the position illustrated, a flow of current through wire 138 is established. Relays 126A and 126B are energized so long as switches 146A and 146B are in the position shown in Fig. 8, which situation continues so long as there is a supply of packages in housing 41. Relay 124 is energized upon thermotime delay tube 147 closing. One of the conditions where such situation exists is when switch 117 contacts 136 and 148 are closed and limit switches 119A and 119B are thrown so that contacts 149A and 149B engage contacts 151A and 151B, respectively, whereupon current flows from lead line 152 through selenium rectifiers 153A and 153B and variable resistor 154 to heat the filament 156 of thermotime delay relay 147. The adjustment of resistor 154 is such that both switches 119A and 119B must be opposite that shown in Fig. 8 or else delay relay 147 will not energize relay 124. Condensers 157A and 157B are charged equal and opposite by their respective rectifiers, when supplied by contacts 151A and 151B. Thus a direct current exists to energize relay 147. This completes a coincidence or "and" circuit so that relay 147 is energized only when both switches 149A and 149B are opposite to that shown in Fig. 8.

Contacts 131 and 132 of relay 122 are operative only in the first movement of carriage 72 as each layer of packages is received on horizontal supports 69. Thereafter, switch 117 returns to the position shown in Fig. 8 with contacts 136 and 137 engaged. When packages 33 in hoppers 106 diminish below the level of aperture 113, photoelectric cell 116 causes contacts 133 and 134 of first relay 122 to engage. Coil 138 of second relay 123 is energized instantaneously by discharge of condenser 159. Condenser 159 is in a circuit through contacts 161 and 162 of second relay 123, limiting resistor 163 and selenium rectifier 164 and lead wire 152. Hence when second relay 123 is energized, upon discharge of condenser 159, contacts 161 and 162 are broken, thus insuring that the energization of second relay 123 is instantaneous. The instantaneous energization of second relay 123 establishes contact between contacts 141 and 166 which, so long as carriage switch 117 is in the position shown in Fig. 8, energizes solenoid 92 to release carriage 72 one notch 89 of ratchet 88.

Each time that the level of packages 33 diminishes below the level of apertures 113, the foregoing sequence of operation is performed. When carriage 72 reaches the limit of its inward movement, button 86 contacts adjustment screw 87, which causes carriage 72 to reverse. After the reversing movement is completed, carriage switch 117 is thrown to the position opposite that shown in Fig. 8. Normally, at this stage of the operation, limit switches 119A and 119B are in the position shown in Fig. 8 and so long as they remain in this position and fourth relays 126A and 126B are in the position shown in Fig. 8, current flows to solenoid 53 controlling valve 51 to advance plunger 39. Advancement of plunger 39 continues until the advancing layers of packages contact limit switches 119A or 119B and throw them from the positions shown in Fig. 8 to the opposite positions. When both switches 119 are thrown to said opposite positions (carriage switch 117 remaining in such position that contacts 136 and 148 are not engaged) current flows through the filament 156 of thermotime delay switch 147 and after the lapse of the predetermined time, third relay 124 is energized. The time interval heretofore mentioned is sufficient to allow air to bleed from cylinders 46 so that continued pressure of plunger 39 against the packages is relieved.

When the amount of boxes in housing 41 diminishes so that switches 146A and 146B are thrown to the position opposite that shown in Fig. 8, warning lamps 167 are illuminated and further one of the two circuits through the coils 168A and 168B of fourth relays 126A and 126B is broken. However, the other circuits through coils 168A and 168B remain energized, these being locking circuits through third relay 124, contacts 142A and 169A and contacts 142B and 169B; fourth relay contacts 171A and 172A and 171B and 172B and switch buttons 144A and 144B. So long as relay coils 168A or 168B are energized, contacts 174A and 175A are engaged, as are contacts 174B and 175B, thereby illuminating signal lamps 180A and 180B. The next time that switches 119A and 119B are thrown to the position opposite that shown in Fig. 8, by reason of new layers of packages being deposited on supports 69, relay 124 is energized, breaking contacts 142A and 169A and 142B and 169B, thus de-energizing coils 168 on relays 126. Thereupon contcats 172A and 173A of relay 126A engage, as also do contacts 172B and 173B of relay 126B. This energizes solenoids 52 controlling valves 49 which retract plungers 39. During the period when the plunger is retracted, the empty shipping carton 32 is removed and a filled one is placed in position. The operators then push button 144 to the position opposite that shown in Fig. 8, which interrupts current through solenoid 52. At this time relay coils 168A and 168B have been de-energized, as heretofore explained, and hence contacts 174A and 176A of relay 126A and contacts 174B and 176B of relay 126B are engaged. So long as buttons 144 are pressed, plungers 39 are advanced. When the plungers are fully advanced, buttons 144 are released and the circuit is reset. It will be observed that the operators cannot retract plungers 39 by pushing buttons 144 until switches 146 are opened.

Although the foregoing invention has been described in some detail by way of illustration and example for purposes of clarity of understanding, it is understood that certain changes and modifications may be practiced within the spirit of the invention and scope of the appended claims.

What is claimed is:

1. In a machine for assembling articles in groups from a carton in which said articles are arranged in a plurality of layers each containing a plurality of rows and columns, a frame, a conveyor associated with said frame on which said articles are deposited, a receiving station having a bed extending transverse to said frame shaped to receive a carton of said articles, a plunger mounted adjacent said bed positioned on its forward stroke to push articles out of said carton toward said frame, plunger-actuating means to reciprocate said plunger, a support on said frame positioned to receive a single layer of articles pushed forward by said plunger, a carriage mounted on said frame for movement transverse to the direction of movement of said plunger, carriage-actuating means to reciprocate said carriage, a pusher on said carriage positioned to push each layer of articles along said support in a direction parallel to the direction of movement of said carriage, a hopper positioned at one end of said support to receive columns of articles pushed off said support by said pusher, said hopper terminating adjacent said conveyor, said carriage-actuating means being arranged to move on its working stroke step by step a distance substantially equal to the width of one column of articles, and timing means to move said carriage-actuating means responsive to the articles in said hopper diminishing below a predetermined number.

2. In a machine for assembling articles in groups from a carton in which said articles are arranged in a plurality of layers each containing a plurality of rows and columns, a frame, a conveyor associated with said frame on which said articles are deposited, a receiving station having a bed extending transverse to said frame shaped to receive a carton of said articles, a plunger mounted adjacent said bed positioned on its forward stroke to push articles out of said carton toward said frame, plunger-actuating means to reciprocate said plunger, a support on said frame positioned to receive a single layer of articles pushed forward by said plunger, a carriage mounted on said frame for movement transverse to the direction of movement of said plunger, carriage-actuating means to reciprocate said carriage, a pusher on said carriage positioned to push each layer of articles along said support in a direction parallel to the direction of movement of said carriage, a hopper positioned at one end of said support to receive columns of articles pushed off said support by said pusher, said hopper terminating adjacent said conveyor, and means to retract said bed a short distance from said support prior to commencement of the working stroke of said pusher.

3. In a machine for assembling articles in groups from a carton in which said articles are arranged in a plurality of layers each containing a plurality of rows and columns, a frame, a conveyor associated with said frame on which said articles are deposited, a receiving station having a bed extending transverse to said frame shaped to receive a carton of said articles, a plunger mounted adjacent said bed positioned on its forward stroke to push articles out of said carton toward said frame, plunger-actuating means to reciprocate said plunger, a support on said frame positioned to receive a single layer of articles pushed forward by said plunger, a carriage mounted on said frame for movement transverse to the direction of movement of said plunger, carriage-actuating means to reciprocate said carriage, a pusher on said carriage positioned to push each layer of articles along said support in a direction parallel to the direction of movement of said carriage, a hopper positioned at one end of said support to receive columns of articles pushed off said support by said pusher, said hopper terminating adjacent said conveyor, and timing means for said plunger-actuating means and for said carriage-actuating means deterring forward movement of said plunger until said carriage has retracted and then deterring forward movement of said carriage until said plunger has moved a new layer of articles onto said support.

4. In a machine for assembling articles in groups from a carton in which said articles are arranged in a plurality of layers each containing a plurality of rows and columns, a frame, a conveyor associated with said frame on which said articles are deposited, a receiving station having a bed extending transverse to said frame shaped to receive a carton of said articles, a plunger mounted adjacent said bed positioned on its forward stroke to push articles out of said carton toward said frame, plunger-actuating means to reciprocate said plunger, a support on said frame positioned to receive a single layer of articles pushed forward by said plunger, a carriage mounted on said frame for movement transverse to the direction of movement of said plunger, carriage-actuating means to reciprocate said carriage, a pusher on said carriage positioned to push each layer of articles along said support in a direction parallel to the direction of movement of said carriage, a hopper positioned at one end of said support to receive columns of articles pushed off said support by said pusher, said hopper terminating adjacent said conveyor, said carriage-actuating means comprising a ratchet having a plurality of steps, the distance between steps being equivalent to the width of one column of articles, a pawl engaging said ratchet, said ratchet and pawl being positioned to permit movement of said carriage step by step on its working stroke and to permit continuous retraction of said carriage on its return stroke, fluid pressure responsive means to reciprocate said carriage and biasing said carriage first to one end and then to the other end of its stroke, valve means for reversing said fluid pressure responsive means at either end of the stroke of said carriage, and means to retract said pawl from engagement with said ratchet responsive to the articles in said hopper diminishing below a predetermined number.

References Cited in the file of this patent

UNITED STATES PATENTS

| | | |
|---|---|---|
| 1,493,480 | De Tour | May 13, 1924 |
| 1,831,130 | Mudd | Nov. 10, 1931 |
| 2,304,533 | Bright | Dec. 8, 1942 |
| 2,526,983 | Wait | Oct. 24, 1950 |